US005798994A

United States Patent [19]
Kamatani

[11] Patent Number: 5,798,994
[45] Date of Patent: Aug. 25, 1998

[54] MULTI-LAYERED OPTICAL DISK READING METHOD USING LIQUID CRYSTAL DIFFRACTION DEVICE

[76] Inventor: Yasuo Kamatani, 2-12-2 Yokoyama, Sagamihara-shi, Kanagawa 229, Japan

[21] Appl. No.: 586,185

[22] Filed: Jan. 16, 1996

[51] Int. Cl.⁶ ........................................................ G11B 7/00
[52] U.S. Cl. ........................... 369/58; 369/44.23; 369/112
[58] Field of Search ............................ 369/44.12, 44.23, 369/44.24, 44.27, 44.29, 50, 54, 58, 112

[56] References Cited

U.S. PATENT DOCUMENTS

| | | | |
|---|---|---|---|
| 5,062,098 | 10/1991 | Hori et al. | 369/112 |
| 5,202,875 | 4/1993 | Rosen et al. | 369/112 X |
| 5,594,713 | 1/1997 | Komma et al. | 369/112 |

*Primary Examiner*—W. R. Young
*Attorney, Agent, or Firm*—Rabin, Champagne & Lynt, P.C.

[57] ABSTRACT

A multi-layered optical disk reading method which reproduces encoded data from each data layer by focusing a laser beam precisely onto the data layer of the multi-layered optical disk. After a multi-layered optical disk is loaded, a central processing unit (CPU) receives an operator's signal to access a certain data layer. Then the CPU refers to stored data in the CPU's memory for diffraction angle to focus the laser beam onto the certain data layer. The CPU retrieves an operational coded signal, and transmits the signal to a liquid crystal diffraction device to modulate the liquid crystal diffraction device to deflect and focus the laser beam onto the certain data layer. After the liquid crystal diffraction device is modulated by the operational signal from the CPU, the CPU also operates a routing circuit to transmit a read-out signal from a detector which receives a reflected laser beam from the certain data layer, to a selected decoding circuit in a data processor.

4 Claims, 6 Drawing Sheets

MULTI-LAYERED OPTICAL DISK READING METHOD USING LIQUID CRYSTAL DIFFRACTION DEVICE

BACKGROUND OF THE INVENTION

1. Field of the Invention

This invention relates to an optical data reproducing method. More specifically, this invention relates to an optical disk reading method which is able to reproduce encoded data from each data layer of a multi-layered optical disk.

2. Description of the Prior Art

Initialized by the vast increase in information that needs to be processed, optical data storage system have become very important system particularly because of their high storage density per area. Most of the recent optical information storage systems rotating single optical disk are used on which the information is digitally stored in concentric circular tracks in an ordered, predefined manner to allow chronological fast reading and fast random access to desired pits of data.

In order to accomplish even more storage capacity of optical disk systems for enormous information processing, such as video or picture communication like so called video-on-demand service, multiple disk systems have been proposed. An optical disk system having two or more data layers may in theory be accessed at different disks by changing the focal point with moving lens. Example of this type of state-of-the-art include U.S. Pat. No. 5,202,875 issued Apr. 13, 1993 to Rosen, et al.; Japanese Published Application, 63-276732 published Nov. 15, 1988 by Watanabe, et al.

Such multiple disk reading system is applied to varied optical disk information storage system. For example, a digital video disk (DVD) system for home entertaining is one of the typical application. The mentioned advantage of vast storage capacity may contribute especially for video signal transmission. In order to reproduce encoded data from each data layer, a laser beam emitted from a laser source has to be focused precisely onto each data layer. To focus the laser beam onto each data layer, the methods such as to change a focusing lens or to move the focusing lens by an actuator are applied to the conventional system. However, such method is not appropriate to apply to the multi-layered optical disk system which has more than two data layers. Because the number of the changeable focusing lens or the focal point interval modulated by the actuator is limited. A multi-layered optical disk reading method is needed to overcomes the mentioned disadvantage of the conventional method.

SUMMARY OF THE INVENTION

The present invention has for its object to provide a multi-layered optical disk reading system which is able to reproduce encoded data from each data layer by focusing laser beam precisely onto the data layer and detecting reflected laser beam from each data layer selectively without employing any mechanical moving component.

The object of the present invention can be achieved by an optical disk reading method, the method comprising the steps of: to load a multi-layered optical disk which has M data layers (wherein M is an integer greater than 1), to receive operator's signal to access Nth data layer of the multi-layered optical disk (wherein N is an integer greater than 1 and not greater than M), to refer to stored data in a central processing unit (CPU) for diffraction angle to focus laser beam onto Nth data layer, to modulate a liquid crystal diffraction device to focus the laser beam onto Nth data layer, and to operate a routing circuit to transmit readout signal from selected detector to a decoding circuit.

After a multi-layered optical disk is loaded, total number of the data layers of the multi-layered disk is identified by reading a total of contents (TOC) data or by any discrimination means. Then operation signal to access certain data layer is transmitted to the CPU, and the CPU retrieves stored data on modulation signal to let the liquid crystal diffraction device to focus the laser beam onto the certain data layer. For example, two operational modulation signals to modulate the liquid crystal diffraction device to focus laser beam onto each of two data layer, must be stored in memory of the CPU for a double-layered optical disk reading system. The CPU send the modulation signal to the liquid crystal diffraction device. According to the modulation signal, the liquid crystal diffraction device modulates each of liquid crystal segment to change numerical aperture between any two of the liquid crystal segments. By changing the numerical aperture between the liquid crystal segments, the transmitted laser beam is focused onto preferred data layer. The reflected laser beam from data layer is transmitted to a detector array circuit. Each of the detector is better to be placed on several position in order to detect selectively the reflected laser beam from selected data layer, and to minimize the effect of an interference. The CPU operates routing circuit to transmit readout signal from selected detector to selected decoding circuit.

For a fuller understanding of the nature and advantages of the present invention reference should be made to the following detailed description taken in conjunction with the accompanying drawings.

BRIEF DESCRIPTION OF DRAWINGS

FIG. 2 shows a first structure of a pick-up head for a multi-layered optical disk reading apparatus the present invention can be applied to;

FIG. 3 shows a second structure of a pick-up head for a multi-layered optical disk reading apparatus the present invention can be applied to;

DETAILED DESCRIPTION OF THE PREFERRED EMBODIMENT

Embodiments of the present invention will be explained with reference to the drawings.

Figure 1:
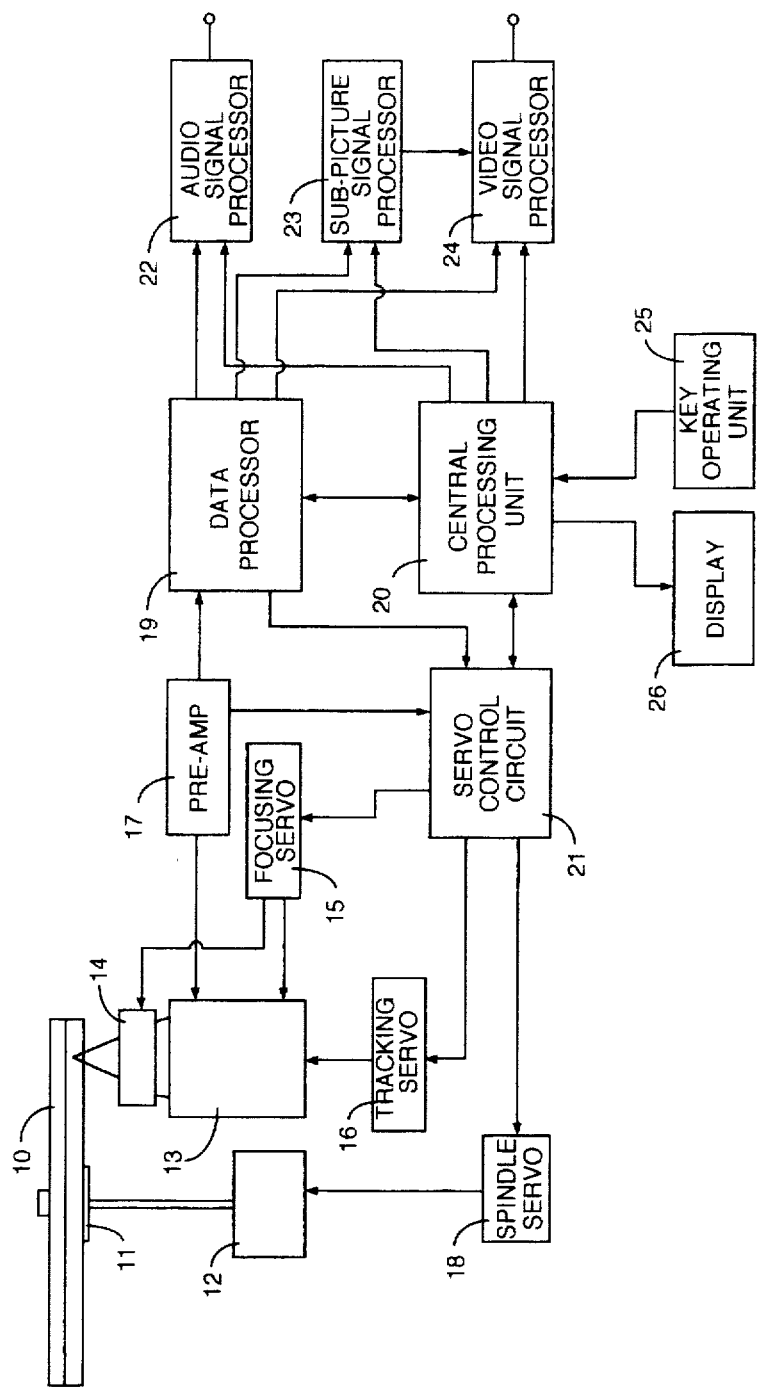
FIG. 1 shows a block diagram of an example of a multi-layered optical disk reading apparatus to which the present invention can be applied.

FIG. 1 is a block diagram of an example of a multi-layered optical disk reading apparatus to which the optical disk reading methods of the present invention can be applied. A multi-layered optical disk 10 which has two or more data layers is mounted on and secured by a turntable 11 to be rotated by a spindle motor 12. Encoded pits on the multi-layered optical disk 10 is read by a pickup 13 which includes a laser diode, a focusing lens, a tracking actuator, a photodetector array, and a focusing lens actuator cooperating with a liquid crystal diffraction device 14. The movement of the pick-up 13 and the modulation of the liquid crystal diffraction device 14 are controlled by a focusing servo circuit 15 and a tracking servo circuit 16. The readout signal from the pickup 13 is transmitted to a pre-amplifier 17. According to focusing error signal, the focusing servo circuit 15 modulates the focusing lens actuator and the liquid crystal diffraction device 14 to move focal point of the laser beam emitted from the laser diode to access certain data layer of the multi-layered optical disk 10. And according to tracking error signal, the tracking servo circuit 16 modulates the tracking actuator to move the pickup 13. The spindle servo circuit 18 modulates the spindle motor 12 in order to track linear velocity of the multi-layered optical disk 10.

The detected readout signal applied to the pre-amplifier 17 from one of the detector in the detector array of the pickup 13, is transmitted to a data processor 19. The data processor 19 consists of at least one decoding circuit to decode the readout signal. In order to reproduce encoded data from two types of optical disk format, for example a compact disk (CD) and a digital video disk (DVD), the data processor must be composed of two decoding circuit. And the routing from the detector to decoding circuit in the data processor 19 is operated by a central processing unit 20 (CPU). Part of the reproduced readout signal by the data processor 19 is transmitted to the CPU 20 to observe data reproduction procedure, and to operate a servo control circuit 21 which modulates the focusing servo circuit 15, the tracking servo circuit 16 and the spindle servo circuit 18. And the decoded readout signal by the data processor 19 is transmitted to an audio processor 22, a sub-picture processor 23 and a video processor 24. The audio processor 22, the sub-picture processor 23 and the video processor 24 are controlled by the CPU 20. The CPU 20 is operated by an operation signal from a key operating unit 25 which transmits all operating signal of an operator. The CPU 20 also controls a display unit 26 to show the data reproducing status to the operator.

Figure 2:
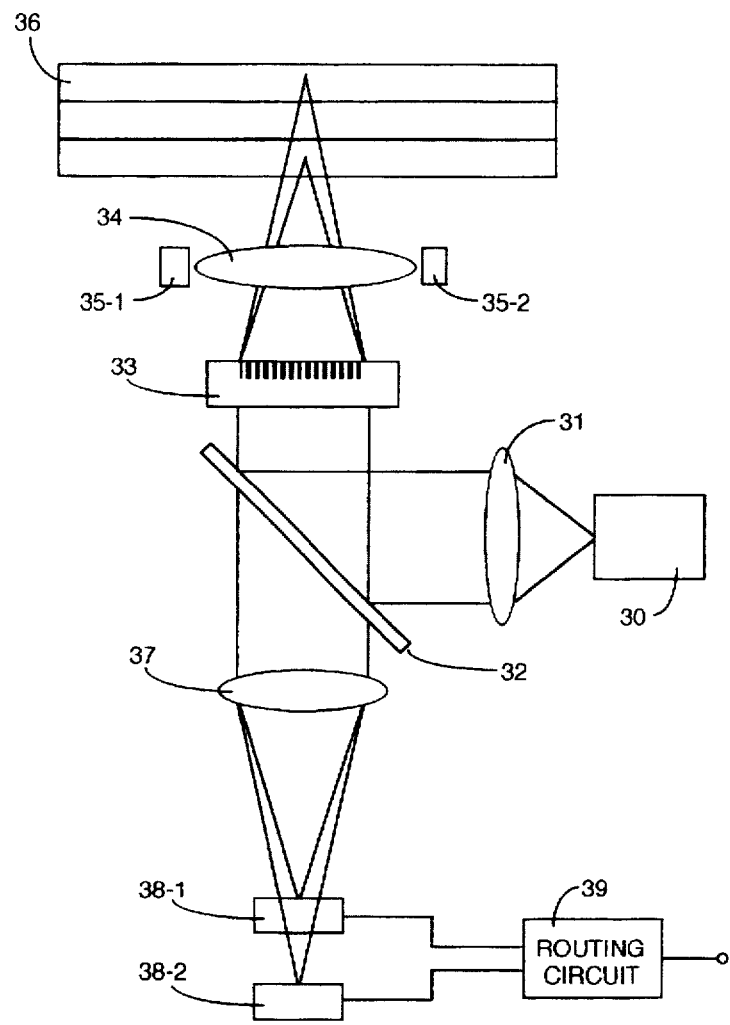

FIG. 2 shows a first exemplified structure of a pick-up 13 described in the FIG. 1 to which the present invention can be applied. A laser beam is emitted from a laser diode 30, and the laser beam is collimated by a collimate lens 31. The collimated laser beam is deflected by a half-mirror 32. Then, the deflected laser beam is focused by a liquid crystal diffraction device 33. By modulating each of liquid crystal segment of the liquid crystal diffraction device 33, the produced focal point can be moved to focus the laser beam onto preferred data layer. Also position of the focal point is precisely moved by focusing lens 34 which is driven by a dual actuator 35-1~2. Reflected laser beam from certain data layer of a multi-layered optical disk 36 is transmitted to a lens 37 and focused to a detector 38-1~2. The detector 38-1 is positioned to detect reflected laser beam from lower data layer, and the detector 38-2 is to detect reflected laser beam from upper data layer selectively. The readout signal from the detector 38-1~2 is transmitted to a routing circuit 39 to selectively send to a decoding circuit of a data processor.

Figure 3:
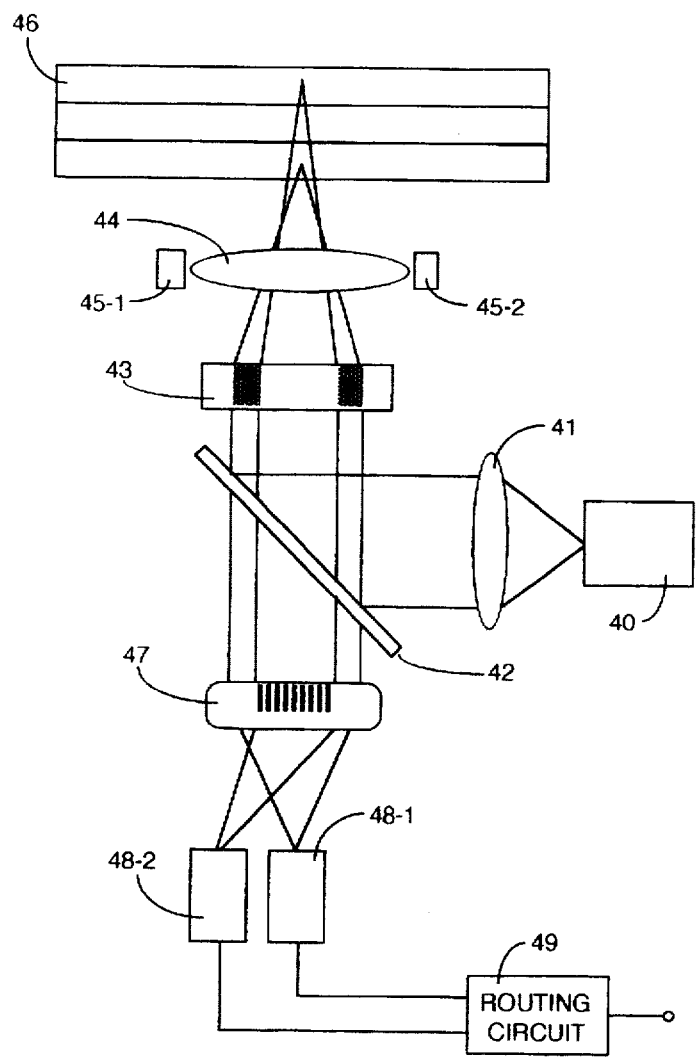

FIG. 3 shows a second exemplified structure of a pick-up 13 described in the FIG. 1 to which the present invention can be applied. A laser beam is emitted from a laser diode 40, and the laser beam is collimated by a collimate lens 41. The collimated laser beam is deflected by a half-mirror 42. Then, the deflected laser beam is focused by a liquid crystal diffraction device 43. By turning on or off each of liquid crystal segment of the liquid crystal diffraction device 43, the distance between the liquid crystal diffraction device 43 and the focal point can be modulated to focus the laser beam onto preferred data layer. In this example described in FIG. 3, the liquid crystal segment shuts outer spectrum of the laser beam to extend the distance to focal point. By modulating the numerical aperture of the liquid crystal diffraction device 43, the focal point can be moved. Also position of the focal point is precisely moved by focusing lens 44 which is driven by a dual actuator 45-1~2. Reflected laser beam from certain data layer of a multi-layered optical disk 46 is transmitted to a grating 47 and transmitted to a detector 48-1~2. The grooves of the grating 47 is fabricated to deflect inner spectrum of the reflected laser beam from the upper data layer of the multi-layered optical disk 46. The detector 48-1 is positioned to detect reflected laser beam from lower data layer, and the detector 48-2 is to detect reflected laser beam from upper data layer selectively. The readout signal from the detector 48-1~2 is transmitted to a routing circuit 49 to selectively send to a decoding circuit of a data processor.

Figure 4:
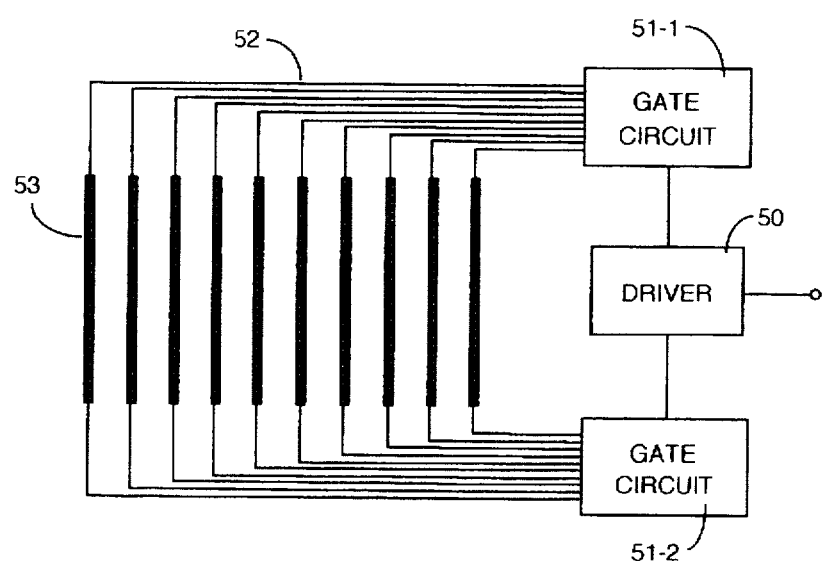
FIG. 4 shows a first pattern of an example of a liquid crystal diffraction device to which the present invention can be applied.

FIG. 4 shows a first pattern of an example of a liquid crystal diffraction device to which the present invention can be applied. And the example of a liquid crystal diffraction device described in FIG. 4 is suitable for the first exemplified structure of a pick-up described in the FIG. 2. According to an operation signal from a central processing unit, a driver circuit 50 modulate each of a gate circuit 51-1~2. Each of an electrode 52 is fabricated to connect to a liquid crystal segment 53. The array of the liquid crystal segment 53 is forming a grating, and by selectively turning on and off the group of liquid crystal segment with equal interval, the numerical aperture between the liquid crystal segments is modulated to change the diffraction angle of the laser beam. For example, by turning on the group of the liquid crystal segment with wide interval and equal interval, the diffraction angle is small. And, by turning on all of the liquid crystal segment with narrow interval and equal interval, the diffraction angle is large.

Figure 5:
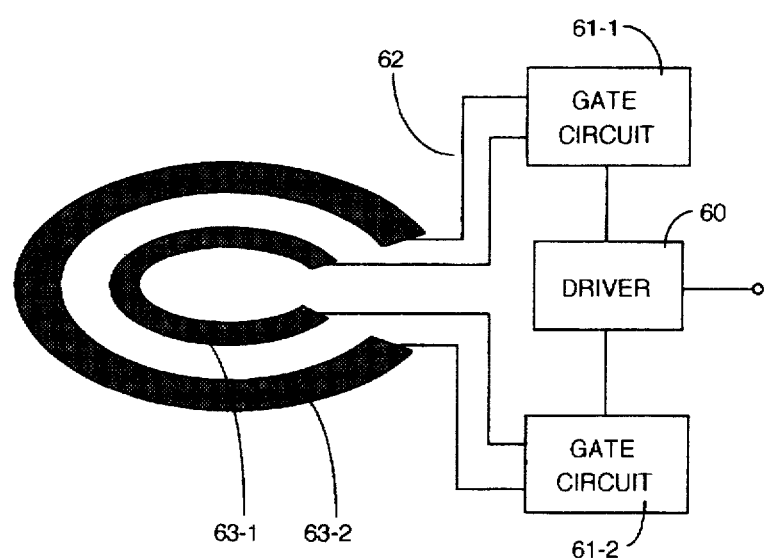
FIG. 5 shows a second pattern of an example of a liquid crystal diffraction device to which the present invention can be applied.

FIG. 5 shows a second pattern of an example of a liquid crystal diffraction device to which the present invention can be applied. And the example of a liquid crystal diffraction device described in FIG. 5 is suitable for the second exemplified structure of a pick-up described in the FIG. 3. According to an operation signal from a central processing unit, a driver circuit 60 modulate each of a gate circuit 61-1~2. Each of an electrode 62 is fabricated to connect to a liquid crystal segment 63-1~2. When the outer liquid crystal segment 63-2 is turned on to shut the outer spectrum of the laser beam, the laser beam is focused at far position because the numerical aperture is small. By turning on or off the liquid crystal segment selectively and changing the numerical aperture, the position of the focal point is moved.

Figure 6:
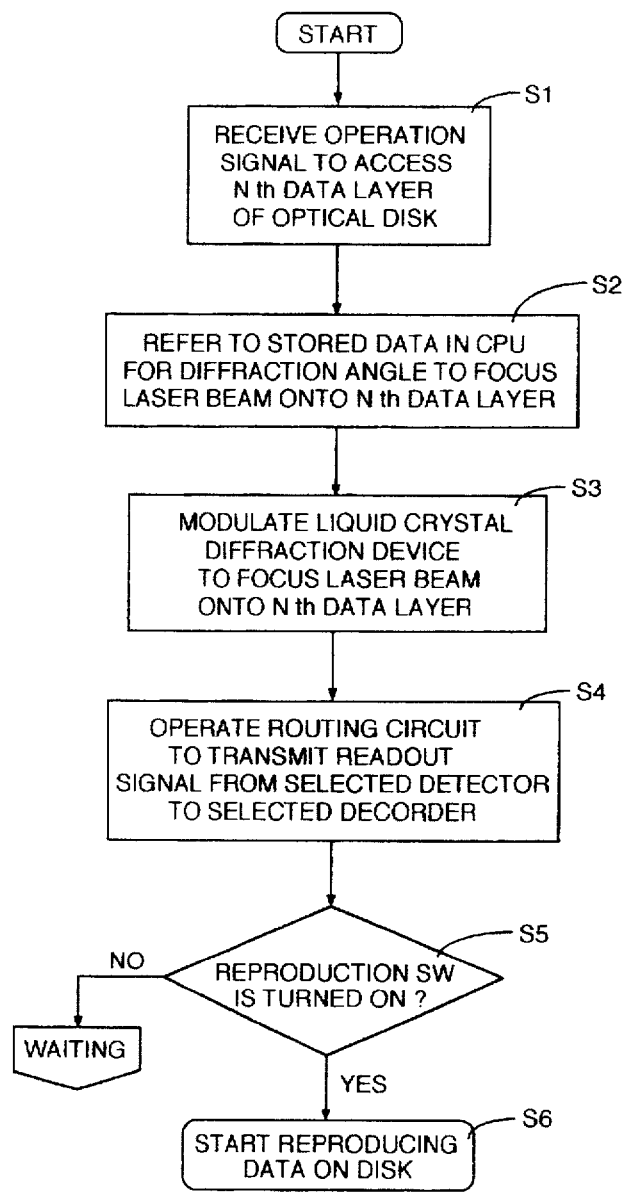
FIG. 6 is a flowchart for a description of an optical disk reading method of the present invention.

FIG. 6 shows a flowchart of an operation processing procedure in the central processing unit (CPU) to which an optical disk reading method of the present invention is applied. The CPU receives an operator's signal to access Nth data layer of a multi-layered optical disk (Step 1: S1). Wherein N is an integer grater than 1, and not grater than total number of data layer M. Then the CPU refers to stored data in the CPU's memory for diffraction angle to focus laser beam onto Nth data layer (S2). The CPU retrieves an operational coded signal, and transmits the signal to a liquid crystal diffraction device to modulate the liquid crystal diffraction device to deflect and focus the laser beam onto Nth data layer (S3). After the liquid crystal diffraction device is modulated by the operational signal from the CPU, the CPU also operates a routing circuit to transmit read-out signal from a detector which receives reflected laser beam from Nth data layer, to a selected decoding circuit in a data processor (S4). The routing circuit can connect and disconnect the read-out signal transmission path from the detector to the decoding circuit. At last, when a reproduction switch of a key operating unit is turned on by the operator (S5), the data reproduction is started (S6).

Although the invention has been particularly shown and described, it is contemplated that various changes and modification may be made without departing from the scope of the invention as set forth in the following claims.

What is claimed is:

1. An optical disk reading method comprising the steps of:

loading a multi-layered optical disk which consists of M data layers, wherein M is an integer greater than 1;

receiving an operation signal to access an Nth data layer of the multi-layered optical disk, wherein N is an integer greater than 1 and not greater than the integer M;

referring to stored data in a central processing unit for an operation code signal to modulate a liquid crystal diffraction device to focus a laser beam onto the Nth data layer;

modulating the liquid crystal diffraction device to focus the laser beam onto the Nth data layer by sending the operation code signal to a focusing servo circuit which drives the liquid crystal diffraction device; and operating a routing circuit to transmit a readout signal from a detector to a decoding circuit.

2. The optical disk reading method of claim 1, wherein said step of modulating said liquid crystal diffraction device is the step of modulating a liquid crystal segment of said liquid crystal diffraction device to change a numerical aperture to transmit the laser beam through the segment.

3. The optical disk reading method of claim 1, wherein said step of modulating said liquid crystal diffraction device is the step of modulating a liquid crystal segment of said liquid crystal diffraction device to change an interval between any two of the liquid crystal segments which form a grating.

4. The optical disk reading method of claim 1, further including a step of identifying the total number of data layers of said multi-layered optical disk, after said step of loading said multi-layered optical disk.

* * * * *